United States Patent
Nagata

(10) Patent No.: US 8,854,510 B2
(45) Date of Patent: Oct. 7, 2014

(54) IMAGE PICKUP APPARATUS, FOCUS DETECTION METHOD, IMAGE GENERATION METHOD, AND STORAGE MEDIUM

(75) Inventor: Keiji Nagata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 13/371,905

(22) Filed: Feb. 13, 2012

(65) Prior Publication Data

US 2012/0212654 A1 Aug. 23, 2012

(30) Foreign Application Priority Data

Feb. 18, 2011 (JP) .................................. 2011-033181
Nov. 18, 2011 (JP) .................................. 2011-252724

(51) Int. Cl.
*H04N 9/64* (2006.01)
*H04N 5/232* (2006.01)
*H04N 9/04* (2006.01)
*H04N 5/367* (2011.01)
*G03B 13/36* (2006.01)
*H04N 5/369* (2011.01)

(52) U.S. Cl.
CPC .......... *H04N 5/23212* (2013.01); *H04N 9/045* (2013.01); *H04N 5/367* (2013.01); *G03B 13/36* (2013.01); *H04N 5/3696* (2013.01)
USPC ......................................... 348/247; 348/241

(58) Field of Classification Search
CPC ... H04N 5/367; H04N 5/3675; H04N 5/2176; H04N 9/045; H04N 5/217
USPC .................................................. 348/247, 241
See application file for complete search history.

(56) References Cited

U.S. PATENT DOCUMENTS

| | | | |
|---|---|---|---|
| 4,410,804 A | 10/1983 | Stauffer | |
| 6,829,008 B1 * | 12/2004 | Kondo et al. | ................ 348/302 |
| 2009/0207264 A1 | 8/2009 | Utsugi | |
| 2010/0091161 A1 * | 4/2010 | Suzuki | ........................ 348/302 |
| 2010/0245631 A1 * | 9/2010 | Hoda et al. | ..................... 348/241 |
| 2011/0109775 A1 * | 5/2011 | Amano | ........................ 348/241 |

FOREIGN PATENT DOCUMENTS

| | | |
|---|---|---|
| CN | 101038363 A | 9/2007 |
| CN | 101075073 A | 11/2007 |

(Continued)

OTHER PUBLICATIONS

The above references were cited in a Jan. 28, 2014 Chinese Office Action, awhich is enclosed with an English Translation, that issued in Chinese Patent Application No. 201210040254.7.

*Primary Examiner* — Tuan Ho
*Assistant Examiner* — Fayez Bhuiyan
(74) *Attorney, Agent, or Firm* — Cowan, Liebowitz & Latman, P.C.

(57) ABSTRACT

An image pickup apparatus includes an image pickup element 10 that includes unit cells capable of individually reading signals from pixels that receive light beams transmitting through different pupil positions of an image pickup lens 5, a detector 20 that generates a pair of image signals in a pupil division direction using a signal from a pixel corresponding to each of the unit cells to perform focus detection based on a phase difference, a defective pixel storage unit 22 that stores defective pixel information, and a defective pixel compensating unit 20 that compensates a signal of a defective pixel based on an output of the defective pixel storage unit. The defective pixel compensating unit 20 compensates the signal of the defective pixel using a signal obtained from a pixel disposed in a direction different from the pupil division direction with respect to the defective pixel.

16 Claims, 5 Drawing Sheets

(56) References Cited

FOREIGN PATENT DOCUMENTS

| | | |
|---|---|---|
| CN | 101889231 A | 11/2010 |
| JP | 58-024105 | 2/1983 |
| JP | 2959142 | 10/1999 |
| JP | 2003-116060 | 4/2003 |
| JP | 2003-244712 | 8/2003 |

* cited by examiner

IMAGE PICKUP APPARATUS, FOCUS DETECTION METHOD, IMAGE GENERATION METHOD, AND STORAGE MEDIUM

BACKGROUND OF THE INVENTION

1. Field of the Invention

The present invention relates to an image pickup apparatus such as a digital still camera that receives light beams transmitting through different pupil positions of an image pickup lens by each pixel of an image pickup element and that is provided with a calculating unit that performs focus detection of a phase difference detection method by a pupil division based on a signal that is obtained by a photoelectric conversion in each pixel.

2. Description of the Related Art

As a method of detecting a focus state of an image pickup lens, an apparatus that performs focus detection of a pupil division method using a two-dimensional sensor that is provided with a microlens in each pixel of the sensor is disclosed in Japanese Patent Laid-Open No. S58-24105. In the apparatus disclosed in Japanese Patent Laid-Open No. S58-24105, a photoelectric conversion portion of each pixel that constitutes the sensor is divided into a plurality of photoelectric conversion portions and the divided photoelectric conversion portions are configured so as to receive lights of different pupil regions of the image pickup lens via the microlens.

In addition, various kinds of image pickup apparatuses capable of both performing focus detection and taking a normal image are also proposed.

In Japanese Patent Laid-Open No. 2003-244712, an image pickup apparatus that is provided with a color separation filter at some pixels including photoelectric conversion regions that convert optical signals from an object into electric signals so that both taking an image and performing focus detection are conveniently achieved is disclosed. In the image pickup apparatus disclosed in Japanese Patent Laid-Open No. 2003-244712, an image is formed based on the electric signals from the pixels where the color separation filter is formed, and the focus detection is performed based on the electric signals from pixels where the color separation filter is not formed.

In Japanese Patent No. 2959142, an image pickup apparatus that also functions as an image sensor that is provided with pixels where a microlens and a photoelectric conversion portion are relatively displaced from each other are two-dimensionally arranged is disclosed. In the image pickup apparatus disclosed in Japanese Patent No. 2959142, a focus state of an image pickup lens is detected based on an image that is generated by pixel arrays having a relative displacement direction of the microlens different from that of the photoelectric conversion portion when detecting the focus state of the image pickup lens. On the other hand, an image is generated by adding pixels that have the relative displacement direction of the microlens different from that of the photoelectric conversion portion when taking a normal image.

Conventionally, an image pickup apparatus that replaces a defective pixel with a pixel having the same color in front of the defective pixel (pre-compensation) when the pixel includes the defective pixel is proposed. In an image pickup apparatus disclosed in Japanese Patent Laid-Open No. 2003-116060, an image pickup apparatus that calculates a correction value of a defective pixel using a peripheral pixel that is selected based on a compensation direction that is selected based on an edge strength index value that is calculated by the peripheral pixel of the defective pixel is proposed.

However, when focus detection is performed by phase difference detection, there is a disadvantage that phase difference information is damaged and an error is generated in a correlation calculation and therefore exact focus detection cannot be performed by the same method.

SUMMARY OF THE INVENTION

The present invention provides an image pickup apparatus capable of performing an compensation that does not damage correlation information even when an image pickup element includes a defective pixel.

An image pickup apparatus as one aspect of the present invention includes an image pickup element that includes a plurality of unit cells capable of individually reading signals from a plurality of pixels that receive light beams transmitting through different pupil positions of an image pickup lens, a detector configured to generate a pair of image signals in a pupil division direction using a signal obtained from a pixel corresponding to each of the unit cells to perform focus detection based on a phase difference of the pair of image signals, a defective pixel storage unit configured to store defective pixel information of the image pickup element, and a defective pixel compensating unit configured to compensate a signal of a defective pixel based on an output of the defective pixel storage unit. The defective pixel compensating unit compensates the signal of the defective pixel using a signal obtained from a pixel that is disposed in a direction different from the pupil division direction with respect to the defective pixel.

An image pickup apparatus as another aspect of the present invention includes an image pickup element that includes a plurality of unit cells capable of individually reading signals from a plurality of pixels that receive light beams transmitting through different pupil positions of an image pickup lens, a defective pixel storage unit configured to store defective pixel information of the image pickup element, a defective pixel compensating unit configured to compensate a signal of a defective pixel based on an output of the defective pixel storage unit, and an image processing unit configured to generate images having a plurality of parallaxes that correspond to the pupil positions based on a signal that is generated in a pixel corresponding to the different pupil positions of the image pickup lens. The defective pixel compensating unit compensates the signal of the defective pixel using a signal obtained from a pixel that is disposed in a direction different from the pupil division direction with respect to the defective pixel.

A focus detection method as another aspect of the present invention includes the steps of performing a photoelectric conversion of each pixel of an image pickup element that has pixels that receive light beams transmitting through different pupil positions of an image pickup lens to generate an image signal, compensating a defective pixel using the image signal of a peripheral pixel for an output of a defective pixel storage unit that stores defective pixel information of the image pickup element, and performing focus detection of a pupil division method based on the image signal after the defective pixel compensation step.

An image generation method as another aspect of the present invention includes the steps of performing a photoelectric conversion of each pixel of an image pickup element that has pixels that receive light beams transmitting through different pupil positions of an image pickup lens to generate an image signal, compensating a defective pixel using the image signal of a peripheral pixel for an output of a defective pixel storage unit that stores defective pixel information of the image pickup element, and generating images having a plurality of parallaxes that correspond to different pupil positions of the image pickup lens based on the image signal that has been obtained by the photoelectric conversion by a pixel corresponding to the pupil positions after the defective pixel compensation step.

A storage medium as another aspect of the present invention stores a program enabling a computer to execute the steps of performing a photoelectric conversion of each pixel of an image pickup element that has pixels that receive light beams transmitting through different pupil positions of an image pickup lens to generate an image signal, compensating a defective pixel using the image signal of a peripheral pixel for an output of a defective pixel storage unit that stores defective pixel information of the image pickup element, and performing focus detection of a pupil division method based on the image signal after the defective pixel compensation step.

A storage medium as another aspect of the present invention stores a program enabling a computer to execute the steps of performing a photoelectric conversion of each pixel of an image pickup element that has pixels that receive light beams transmitting through different pupil positions of an image pickup lens to generate an image signal, compensating a defective pixel using the image signal of a peripheral pixel for an output of a defective pixel storage unit that stores defective pixel information of the image pickup element, and generating images having a plurality of parallaxes that correspond to different pupil positions of the image pickup lens based on the image signal that has been obtained by the photoelectric conversion by a pixel corresponding to the pupil positions after the defective pixel compensation step.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

Embodiment 1

Figure 1:
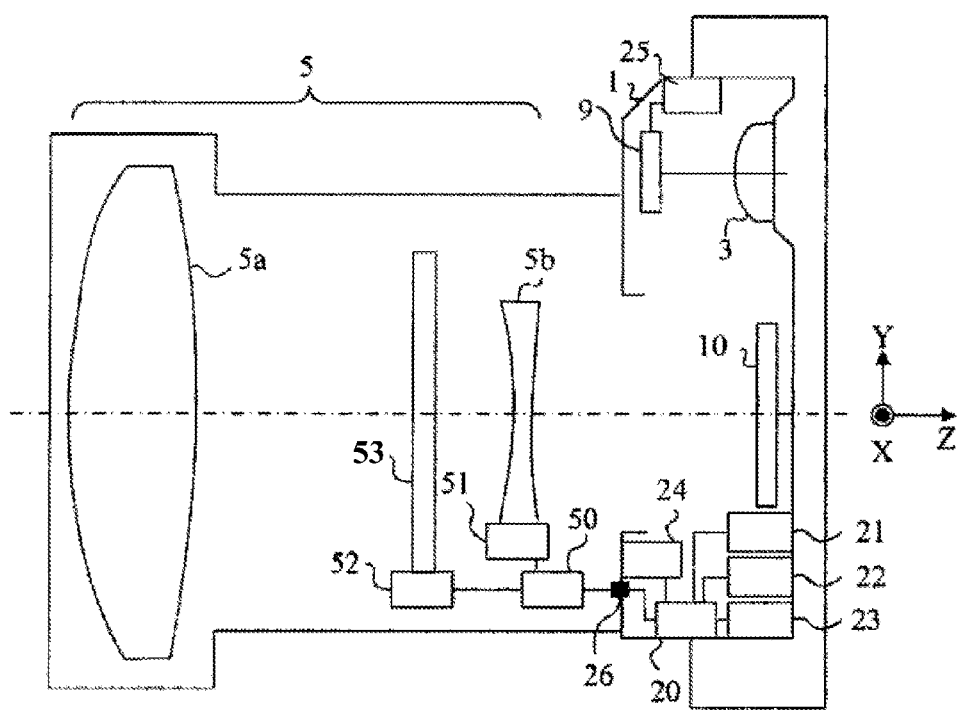
FIG. 1 is a configuration diagram of a camera system in a preferred embodiment of the present invention.

FIG. 1 is a configuration diagram of a camera system of a preferred embodiment of the present invention. Reference numeral 10 denotes an image sensor (an image pickup element), which is disposed on an imaging plane of an image pickup lens 5 of a digital still camera 1 (an image pickup apparatus). The image sensor 10 includes a plurality of pixels that receive light beams that transmit through different positions of a pupil of the image pickup lens 5 in the same microlens. The digital still camera 1 includes a CPU 20 that controls a whole of the digital still camera 1 and an image sensor control circuit 21 that is a controller that performs a drive control of the image sensor 10. The digital still camera 1 also includes an image processor 24 (an image processing unit) that performs an image processing of an image signal that is imaged by the image sensor 10, a liquid crystal display element 9 that is a display that displays the image obtained by the image processing of the image processor 24, and a liquid crystal display element driving circuit 25 that drives the liquid crystal display element 9. Furthermore, the digital still camera 1 includes an eyepiece 3 that is used to observe an object image that is displayed on the liquid crystal display element 9 and a memory circuit 22 that records the image taken by the image sensor 10. The memory circuit 22 also has a function as a defective pixel storage portion that stores information, i.e. defective pixel information, related to a defective pixel of the image sensor 10. The digital still camera 1 also includes an interface circuit 23 that outputs the image obtained by the image processing of the image processor 24 to an outside of the digital still camera 1.

The image pickup lens 5 can be detachable to the digital still camera 1, and for convenience it is depicted as two lenses 5a and 5b in the drawing, but in reality it is configured by many lenses. Focusing information that is sent from the CPU 20 of the digital still camera 1 is received by a lens CPU 50 via an electric contact 26, and the image pickup lens 5 is adjusted so as to be in an in-focus state by an image pickup lens driving mechanism 51 based on the focusing information. Reference numeral 53 denotes a stop device that is disposed near the pupil of the image pickup lens 5, which is configured so as to be set to a predetermined stop value by a stop driving mechanism 52. The CPU 20 also includes functions as a calculating unit that calculates a focus state of the image pickup lens 5 based on an output of the image sensor 10 and a defective pixel compensating unit that compensates a defective pixel described below based on an image signal of a peripheral pixel.

Next, the image sensor that takes an image and that performs focus detection will be described.

Figure 2:
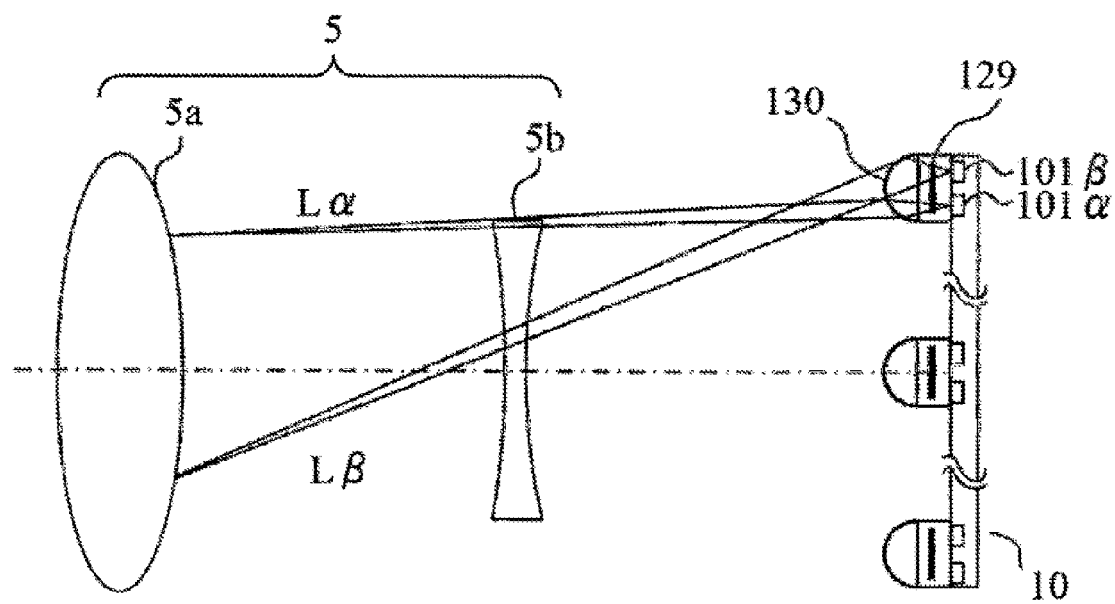
FIG. 2 is a diagram of describing a principle of focus detection by a pupil division method using an image sensor.
Figure 3:
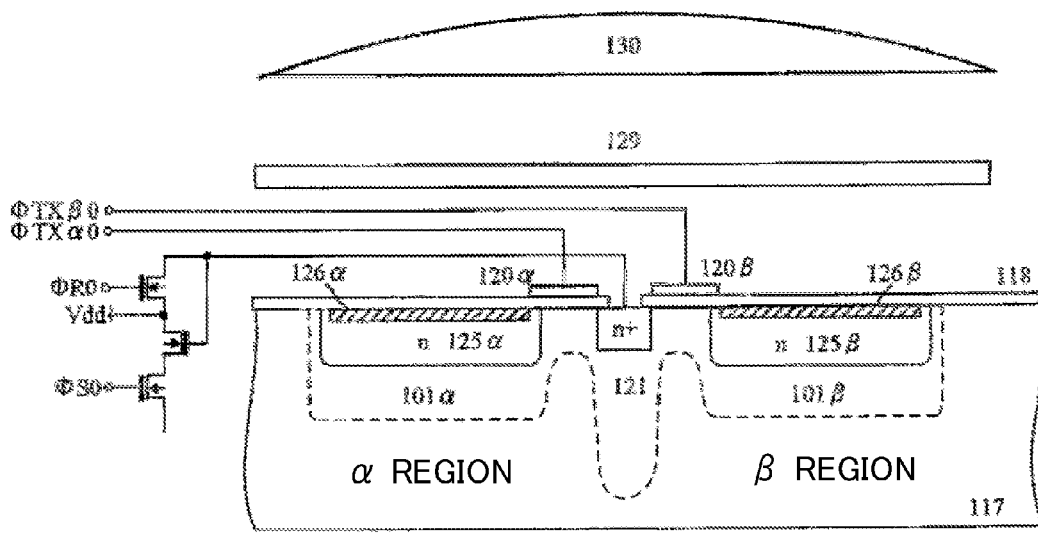
FIG. 3 is a cross-sectional diagram of a part of the image sensor in the preferred embodiment of the present invention.

FIG. 2 is a diagram of describing a principle of focus detection of a pupil division method using the image sensor 10, and FIG. 3 is a cross-sectional diagram of one pixel of the image sensor 10.

The image sensor 10 is disposed on the imaging plane of the image pickup lens 5. One pixel of the image sensor 10 is configured by two photoelectric conversion portions 101α and 101β, and the photoelectric conversion portions 101α and 101β are set so as to be in a relation of substantially forming an image with respect to the pupil of the image pickup lens 5 by a microlens 130 that is formed at a side of the image pickup lens of each photoelectric conversion portion.

The photoelectric conversion portion 101α receives a light beam Lα that transmits through an upper portion in the drawing of the pupil of the image pickup lens 5, and the photoelectric conversion portion 101β receives a light beam Lβ that transmits through a lower portion in the drawing of the pupil of the image pickup lens 5. When the focus detection is performed, charges of the photoelectric conversion portions 101α and 101β are individually outputted to a floating diffusion portion 121 via transfer gates 120α and 120β at different timings to be read to the outside of the image sensor 10. Furthermore, the output from each photoelectric conversion portion of the plurality of pixels generates an image formed by a light beam transmitting through different pupil positions of the image pickup lens.

A method of performing the focus detection using the image that is generated by the light beam transmitting through the different pupil positions of the image pickup lens is publicly known as disclosed in Japanese Patent Laid-Open No. H5-127074.

On the other hand, at the time of taking a normal image, the transfer gates 120α and 120β are simultaneously turned on to output the charges of the photoelectric conversion portions 101α and 101β to the floating diffusion portion 121 at the same timing, and then the charges are added in the pixel to be outputted.

Figure 4:
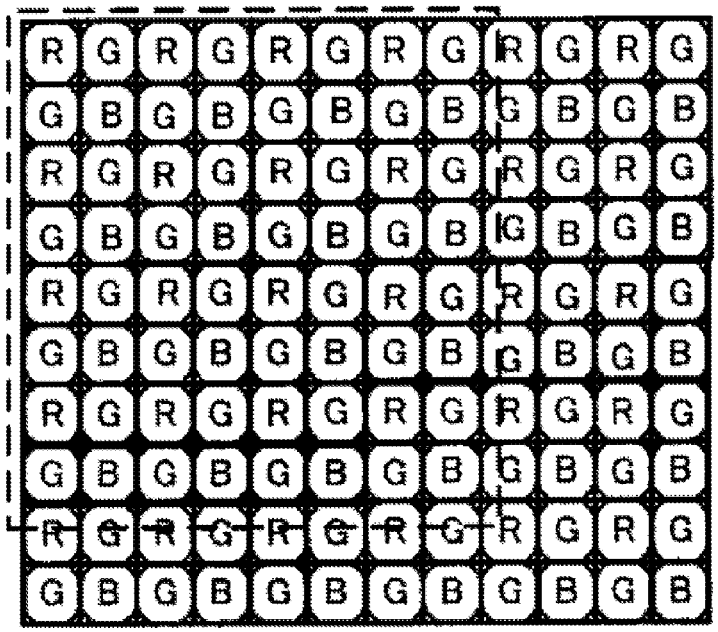
FIG. 4 is a plan view of the image sensor in the preferred embodiment of the present invention.

FIG. 4 is a plan view of illustrating a color filter and a microlens of the image sensor 10 that is an image pickup element. One cell in the drawing indicates one microlens. The characters of "R", "G", and "B" in each cell represent color phases of the color filters.

Figures 5, 6:
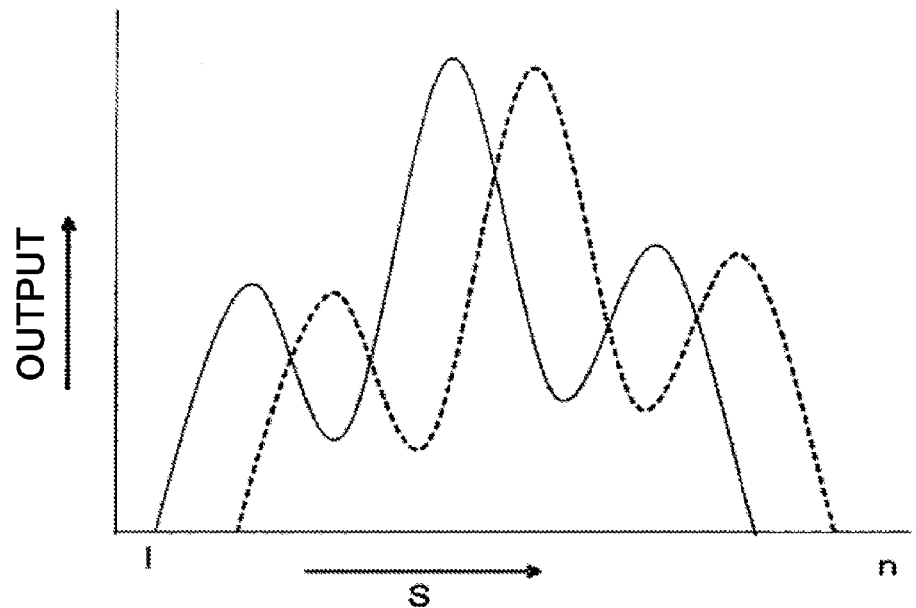
FIG. 5 is a plan view of a part of the image sensor in the preferred embodiment of the present invention.
FIG. 6 is a diagram of a line spread function of an image pickup lens that is generated by the image sensor in the preferred embodiment of the present invention.

FIG. 5 is a plan view of a part of the image sensor 10 illustrated in FIG. 4, which illustrates a configuration of the image pickup element in one microlens of a region that is surrounded by a dashed line in FIG. 4. One cell in the drawing indicates one microlens (unit cell), which is configured by four divided pixels of symbol a to d, each of which receives a light beam that transmits through difference position of the pupil of the image pickup lens.

When the normal image is taken, the four pixels of a to d are added to treat the added pixels as one pixel signal for one microlens to be able to take the normal image.

The pixels Ga and Gc that are surrounded by solid lines and the pixels Gb and Gd that are surrounded by dashed lines are added to make SAn and SBn signals, respectively, and then a phase difference of the SA signal and the SB signal that are connected in a one-dimensional direction (a pupil division direction) is obtained to be able to detect a focal point of the image pickup lens. In the embodiment, the pupil division direction is a horizontal direction.

FIG. 6 illustrates a pair of one-dimensional images that are obtained by the light beam formed by adding a signal of each pixel by one line in the pupil division direction and dividing the pupil of the image pickup lens to the right and left (the SA signal and SB signal illustrated in FIG. 5). The phase difference of the pair of one-dimensional images is detected to calculate the focal point of the image pickup lens. In the present embodiment, the pair of one-dimensional images is formed by signals of G and B pixels or G and R pixels. The pair of one-dimensional images does not have to be obtained from signals of all pixels in one line, and it may also be obtained from a part of the signals in one line.

The pair of one-dimensional images may also be formed by adding the G and B pixels or the G and R pixels as one pixel signal. Furthermore, the pair of one-dimensional images may also be formed by adding four pixels of the two G pixels, B pixel, and R pixel that constitute a Bayer array as one pixel signal.

A method of detecting the focus state of the image pickup lens using the pupil division method, i.e. using the image formed by light beams transmitting through different regions of the pupil of the image pickup lens 5, uses a method that is for example disclosed in Japanese Patent Laid-Open No. 2001-124984.

Next, referring to FIG. 7, a method of performing a defective pixel compensation for the defective pixel will be described. When the b-pixel of SB3 is a defective pixel, the CPU 20 as a defective pixel compensating unit performs an compensation by an average output of signals of SB3_U and SB3_D that are disposed in a vertical direction with respect to the pupil division direction. Since the compensation is performed by the signals in the vertical direction with respect to the pupil division direction, phase difference information is not damaged and therefore focus detection accuracy is not deteriorated. The compensation method is not limited to this, and any one of SB3_U and SB3_D signals may also be used. Alternatively, any one of the b pixels of the SB3_U and SB3_D signals or a signal generated by combining these signals may also be used.

In the above embodiment, the compensation is performed based on a pixel signal in the vertical direction with respect to the pupil division direction, but the phase information is not greatly damaged even when the compensation is performed in a direction other than the pupil division direction. For example, the signal of the defective pixel can be compensated by using a signal of a pixel that is disposed near the defective pixel and that has the same color in a direction different from the pupil division direction. The pixel that is disposed near the defective pixel (the peripheral pixel) means for example a pixel that is in an area A between two pixels (b-pixel of SB2 and a-pixel of SA3) that have the same color as the defective pixel in the microlens nearest to the microlens including the defective pixel in the pupil division direction of FIG. 7. It is preferred that the pixel that is disposed near the defective pixel mean a pixel that is disposed in a direction different from the pupil division direction and that has the same color as the defective pixel in the microlens nearest to the microlens including the defective pixel.

In the above embodiment, an example where the pixel signal that transmits through the microlens different from the microlens including the defective pixel is used to perform the defective pixel compensation is described. However, when the defect exists in a Gb-pixel of SB3, the defective pixel compensation may also be performed by replacing it by a signal from a Gd-pixel in a direction different from the pupil division direction in the same microlens as the microlens including the defective pixel. A signal that is used for the compensation may also be generated by combining the signals of the b-pixel of SB3_U, the b-pixel of SB3_D, and the d-pixel of SB3.

Figure 8:
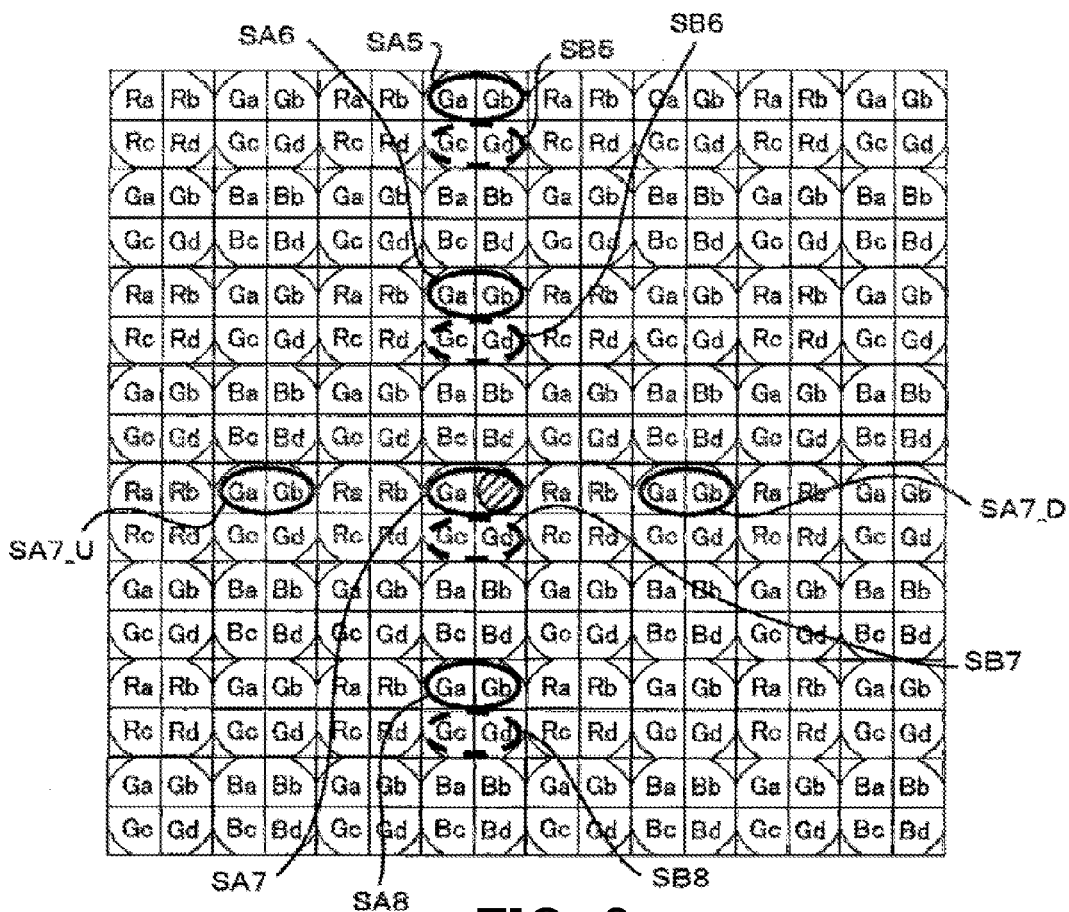
FIG. 8 is a diagram of the defective pixel compensation in the preferred embodiment of the present invention.

In the above embodiment, the case in which the pupil division direction is the horizontal direction is described, but the pupil division direction may also be the vertical direction. The pupil division direction may also be switched between the horizontal direction and the vertical direction. FIG. 8 illustrates a case where the pupil division direction is the vertical direction. For example, a Gb-pixel of SA7 is a defect pixel, the compensation is performed by using an average output of signals of SA7_U and SA7_D in the vertical direction with respect to the pupil division direction. Since the compensation is performed by using the signals in the vertical direction with respect to the pupil division direction, the phase difference information is not damaged and therefore the focus detection accuracy is not deteriorated. The compensation method is not limited to the above method, and any one of signals of SA7_U and SA7_D may be used. Any one of signals of the b-pixel of SA7_U and the b-pixel of SA7_D or a signal generated by combining them may also be used. The defective pixel compensation may be performed by replacing it by a signal from a Ga-pixel disposed in a direction different from the pupil division direction in the same microlens as the microlens including the defective pixel. The signal that is used for the compensation can also be generated by the signal that is obtained by combining the signals of the b-pixel of SA7_U, the b-pixel of SA7_D, and the a-pixel of SA7.

Figure 9:
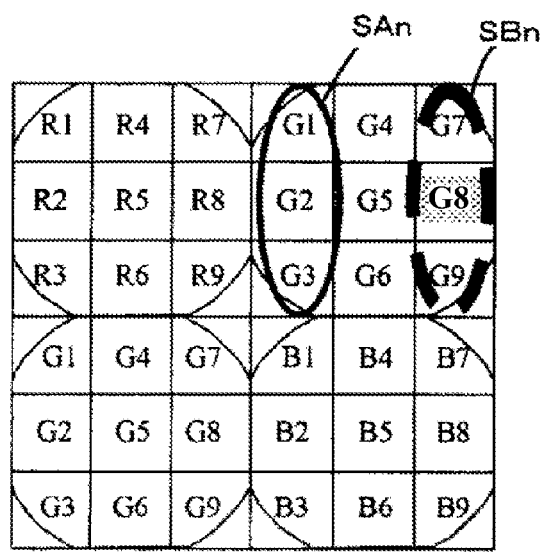
FIG. 9 is a diagram of the defective pixel compensation in the preferred embodiment of the present invention.

When a plurality of pixels in the direction different from the pupil division direction exist in the same microlens, the compensation may also be performed by using the signal from the pixel that is disposed in the direction different from the pupil division direction in the same microlens. For example, when G8 in SBn is the defective pixel as illustrated in FIG. 9, the compensation may also be performed by using the signals from a G7-pixel and a G9-pixel that are disposed in the direction different from the pupil division direction in the same microlens.

In the embodiment, the compensation is performed by using the pixel having the same color that is disposed in the direction different from the pupil division direction, and alternatively the compensation may be performed in accordance with a color ratio in the periphery of the defective pixel based on a signal from a pixel having a different color that is disposed in the direction different from the pupil division direction. Even in this case, as described above, it is preferred that the signal of the defective pixel be compensated in accordance with the color ratio in the periphery of the defective pixel using the signal from the pixel having the different color.

According to the embodiment, even when the image pickup element includes a defective pixel, the compensation by which correlation information is not damaged is achieved and the focus state of the image pickup lens can be detected with high accuracy.

Embodiment 2

In Embodiment 2, a three-dimensional image is generated and displayed using the camera system of the present invention. A configuration of the camera system of the embodiment is the same as the camera system of Embodiment 1. Therefore, configuration elements common to those of Embodiment 1 are denoted by the same reference numerals as Embodiment 1. As a method of generating and displaying the three-dimensional image, for example a method disclosed in Japanese Patent Laid-Open No. S58-24105 can be used. In Japanese Patent Laid-Open No. S58-24105, a first image is generated from outputs of all right-side detectors and a second image is generated from outputs of all left-side detectors, and a three-dimensional image is displayed based on parallax of two images to be displayed.

In the embodiment, in the configuration diagram of the digital still camera 1 of FIG. 1, the image processor 24 obtains the output of the image pickup element that is obtained by performing the pupil division to process it to be an image having parallax. In other words, in the embodiment, the image processor 24 can generate images having a plurality of parallaxes that correspond to the pupil positions based on a signal that is obtained by the photoelectric conversion using the pixel corresponding to the different pupil position of the image pickup lens 5.

Figure 7:
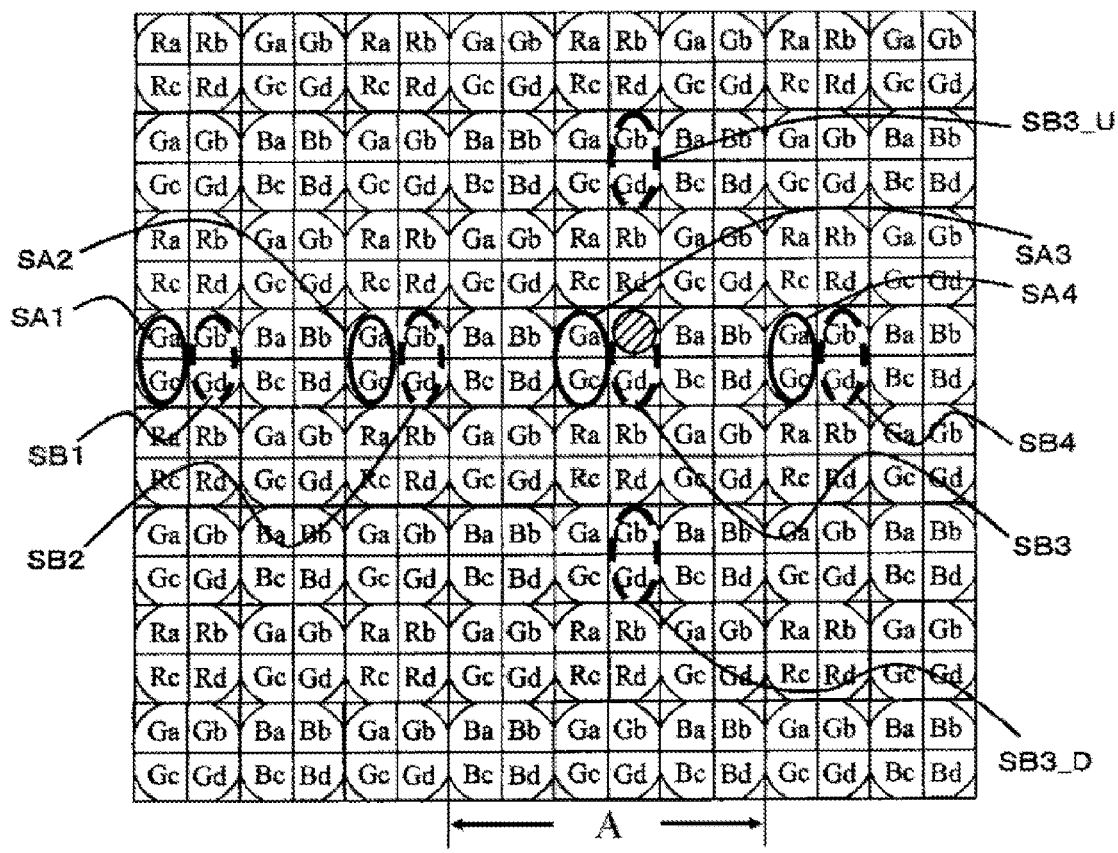
FIG. 7 is a diagram of defective pixel compensation in the preferred embodiment of the present invention.

Referring to FIG. 7, a method of performing a defective pixel compensation for a defective pixel in displaying the three-dimensional image will be described.

When the b-pixel of SB3 is the defective pixel, the CPU 20 as a defective pixel compensating unit performs an compensation by an average output of the signals of SB3_U and SB3_D that are arranged in the vertical direction with respect to the pupil division direction, i.e. with respect to a parallax direction. Since the compensation is performed by using the signal in the vertical direction with respect to the pupil division direction, the three-dimensional image can be displayed without damaging the parallax information. The compensation method is not limited to the above method, and alternatively the other method described in Embodiment 1 may also be used.

In the embodiment, the compensation is performed by using a pixel signal in the vertical direction with respect to the pupil division direction, but the parallax information is not greatly damaged even when the compensation is performed by using a pixel signal in a direction other than the pupil division direction. The method described in Embodiment 1 can also be applied to the compensation method using the pixel signal in the direction other than the pupil division direction.

In the embodiment, an example in which the signal obtained from the pixel that transmits through the microlens different from that including the defective pixel is used for the defective pixel compensation is described. However, when the Gb-pixel of SB3 includes a defect, the defective pixel compensation can also be performed by replacing the signal from the GB-pixel with a signal from the Gd-pixel that is disposed in the direction different from the pupil division direction in the same microlens as the microlens including the defective pixel.

When a plurality of pixels in the direction different from the pupil division direction exist in the same microlens, the compensation may also be performed by using a signal from a pixel that is disposed in the direction different from the pupil division direction it the same microlens. For example, when a G8-pixel in SBn as illustrated in FIG. 9 is the defective pixel, the compensation may also be performed by using signals from a G7-pixel and a G9-pixel that are disposed in a direction different from the pupil division direction in the same microlens.

In the embodiment, the compensation is performed by using the signal from a pixel having the same color that is disposed in a direction different from the pupil division direction, but the compensation may also be performed in accordance with a color ratio in the periphery of the defective pixel using a signal from a pixel having a different color that is disposed in a direction different from the pupil division direction.

According to the embodiment, an compensation can be achieved without damaging correlation information to generate and display a three-dimensional image with high accuracy even when an image pickup element includes a defective pixel.

Next, referring to FIG. 3, the configuration of the image sensor 10 of the preferred embodiment of the present invention will be described.

FIG. 3 is a cross-sectional view of a part of the image sensor 10, which is a cross-sectional view of an area surrounded by a dashed line indicated in the plan view of the part of the image sensor 10 in FIG. 5. A pixel at the right side in the drawing indicates a first pixel that is capable of receiving light from a pupil region at one side of the image pickup lens 5, and a pixel at the left side in the drawing indicates a second pixel that is capable of receiving light from a pupil region at the other side of the image pickup lens 5.

Reference numeral 117 denotes a P-type well, and reference numeral 118 denotes a $SiO_2$ film that is a gate insulating film. Reference numerals 126α and 126β are surface $P^+$ layers, which constitute photoelectric conversion portions 101α and 101β along with n layers 125α and 125β. Reference numerals 120α and 120β are transfer gates that transfer charges accumulated in the photoelectric conversion portions 101α and 101β to a floating diffusion portion 121. Reference numeral 129 denotes a color filter and reference numeral 130 denotes a microlens, and the microlens 130 is formed to have a shape and a position so that a pupil of the image pickup lens 5 conjugates with the photoelectric conversion portions 101α and 101β of the image sensor 10. The photoelectric conversion portions 101α and 101β are formed so as to dispose the floating diffusion portion 121 therebetween, and the charges generated in the photoelectric conversion portions 101α and 101β are transferred via the transfer gates 120α and 120β respectively.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In the above embodiment, the lens-interchangeable digital still camera is described, but the present invention can also be applied to an image pickup apparatus (an optical apparatus) such as a lens-integrated digital still camera or a video camera.

According to the present invention, an compensation can be achieved without damaging correlation information even when an image pickup element includes a defective pixel.

As described above, the present invention can provide an image pickup apparatus that is capable of detecting a focus state of an image pickup lens with high accuracy.

This application claims the benefits of Japanese Patent Application No. 2011-033181, filed on Feb. 18, 2011, and Japanese Patent Application No. 2011-252724, filed on Nov. 18, 2011, which are hereby incorporated by reference herein in their entirety.

What is claimed is:

1. An image pickup apparatus comprising:
an image pickup unit that includes two-dimensionally arrayed microlenses and a plurality of photoelectric conversion portions, two or more of the plurality of photoelectric conversion portions corresponding to one microlens;
a generation unit configured to generate a recording image using a signal output from the plurality of photoelectric conversion portions;
a detection unit configured to generate a pair of image signals in a pupil division direction using a signal obtained from the plurality of photoelectric conversion portions to perform focus detection based on a phase difference of the pair of image signals;
a defective photoelectric conversion portion storage unit configured to store defective photoelectric conversion portion information of the image pickup unit; and
a defective photoelectric conversion portion compensating unit configured to compensate a signal of a defective photoelectric conversion portion based on an output of the defective photoelectric conversion portion storage unit,
wherein the defective photoelectric conversion portion compensating unit compensates the signal of the defective photoelectric conversion portion using a signal obtained from a photoelectric conversion portion that is disposed in a direction different from the pupil division direction with respect to the defective photoelectric conversion portion,
wherein the image pickup unit includes color filters corresponding for each of the microlenses, and
wherein the defective photoelectric conversion portion compensating unit corrects a signal of the defective photoelectric conversion portion using a signal output from a photoelectric conversion portion having a same color as the defective photoelectric conversion portion.

2. The image pickup apparatus according to claim 1, wherein the defective photoelectric conversion portion compensating unit compensates the signal of the defective photoelectric conversion portion using a signal obtained from a photoelectric conversion portion that is disposed in a vertical direction of the pupil division direction with respect to the defective photoelectric conversion portion.

3. The image pickup apparatus according to claim 1, wherein a photoelectric conversion portion that is used to compensate the signal of the defective photoelectric conversion portion is included in a second unit cell that is disposed in a vertical direction of the pupil division direction with respect to a first unit cell that includes the defective photoelectric conversion portion, and
wherein a position of the photoelectric conversion portion that is used to compensate the signal of the defective photoelectric conversion portion in the second unit cell is a position corresponding to a position of the defective photoelectric conversion portion in the first unit cell.

4. The image pickup apparatus according to claim 1, wherein an image signal is outputted by adding signals obtained from all photoelectric conversion portion included in each unit cell when an image is taken.

5. The image pickup apparatus according to claim 1, wherein a photoelectric conversion portion that is used to compensate the signal of the defective photoelectric conversion portion when the pupil division direction is a first direction is different from a photoelectric conversion portion that is used to compensate the signal of the defective photoelectric conversion portion when the pupil division direction is a second direction different from the first direction.

6. The image pickup apparatus according to claim 4, wherein the defective photoelectric conversion portion compensating unit compensates the signal of the defective photoelectric conversion portion using a signal obtained from a photoelectric conversion portion that is disposed in a direction different from the pupil division direction in the same unit cell as the defective photoelectric conversion portion.

7. An image pickup apparatus comprising:
an image pickup unit that includes two-dimensionally arrayed microlenses and a plurality of photoelectric conversion portions, two or more of the plurality of photoelectric conversion portions corresponding to one microlens;
a generation unit configured to generate a recording image using a signal output from the plurality of photoelectric conversion portions;
a defective photoelectric conversion portion storage unit configured to store defective photoelectric conversion portion information of the image pickup element;
a defective photoelectric conversion portion compensating unit configured to compensate a signal of a defective photoelectric conversion portion based on an output of the defective photoelectric conversion portion storage unit; and
an image processing unit configured to generate images having a plurality of parallaxes that correspond to the pupil positions based on a signal that is generated in a photoelectric conversion portion corresponding to the different pupil positions of the image pickup lens,
wherein the defective photoelectric conversion portion compensating unit compensates the signal of the defective photoelectric conversion portion using a signal obtained from a photoelectric conversion portion that is disposed in a direction different from the pupil division direction with respect to the defective photoelectric conversion portion, wherein the image pickup unit includes color filters corresponding for each of the microlenses, and wherein the defective photoelectric conversion portion compensating unit corrects a signal of the defective photoelectric conversion portion using a signal output from a photoelectric conversion portion having a same color as the defective photoelectric conversion portion.

8. The image pickup apparatus according to claim 7, wherein the defective photoelectric conversion portion compensating unit compensates the signal of the defective photoelectric conversion portion using a signal obtained from a photoelectric conversion portion that is disposed in a vertical direction of the pupil division direction with respect to the defective photoelectric conversion portion.

9. The image pickup apparatus according to claim 7, wherein a photoelectric conversion portion that is used to compensate the signal of the defective photoelectric conversion portion is included in a second unit cell that is disposed in a vertical direction of the pupil division direction with respect to a first unit cell that includes the defective photoelectric conversion portion, and wherein a position of the photoelectric conversion portion that is used to compensate the signal of the defective photoelectric conversion portion in the second unit cell is a position corresponding to a position of the defective photoelectric conversion portion in the first unit cell.

10. The image pickup apparatus according to claim 7, wherein an image signal is outputted by adding signals obtained from all photoelectric conversion portion included in each unit cell when an image is taken.

11. The image pickup apparatus according to claim 7, wherein a photoelectric conversion portion that is used to compensate the signal of the defective photoelectric conversion portion when the pupil division direction is a first direction is different from a photoelectric conversion portion that is used to compensate the signal of the defective photoelectric conversion portion when the pupil division direction is a second direction different from the first direction.

12. The image pickup apparatus according to claim 7, wherein the defective photoelectric conversion portion compensating unit compensates the signal of the defective photoelectric conversion portion using a signal obtained from a photoelectric conversion portion that is disposed in a direction different from the pupil division direction in the same unit cell as the defective photoelectric conversion portion.

13. A focus detection method comprising the steps of:
performing a photoelectric conversion of each photoelectric conversion portion of an image pickup unit that includes two-dimensionally arrayed microlenses and a plurality of photoelectric conversion portions, two or more of the plurality of photoelectric conversion portions corresponding to one microlens;

generating a recording image using a signal output from the plurality of photoelectric conversion portions;

compensating a defective photoelectric conversion portion using the image signal of a peripheral photoelectric conversion portion for an output of a defective photoelectric conversion portion storage unit that stores defective photoelectric conversion portion information of the image pickup unit; and performing focus detection of a pupil division method based on the image signal after the defective photoelectric conversion portion compensation step, wherein the defective photoelectric conversion portion compensating step compensates the signal of the defective photoelectric conversion portion using a signal obtained from a photoelectric conversion portion that is disposed in a direction different from the pupil division direction with respect to the defective photoelectric conversion portion, wherein the image pickup unit includes color filters corresponding for each of the microlenses, and wherein the defective photoelectric conversion portion compensating unit corrects a signal of the defective photoelectric conversion portion using a signal output from a photoelectric conversion portion having a same color as the defective photoelectric conversion portion.

14. An image generation method comprising the steps of:
performing a photoelectric conversion of each photoelectric conversion portion of an image pickup unit that includes two-dimensionally arrayed microlenses and a plurality of photoelectric conversion portions, two or more of the plurality of photoelectric conversion portions corresponding to one microlens;

generating a recording image using a signal output from the plurality of photoelectric conversion portions;

compensating a defective photoelectric conversion portion using the image signal of a peripheral photoelectric conversion portion for an output of a defective photoelectric conversion portion storage unit that stores defective photoelectric conversion portion information of the image pickup element; and generating images having a plurality of parallaxes that correspond to different pupil positions of the image pickup lens based on the image signal that has been obtained by the photoelectric conversion by a photoelectric conversion portion corresponding to the pupil positions after the defective photoelectric conversion portion compensation step, wherein the defective photoelectric conversion portion compensating step compensates the signal of the defective photoelectric conversion portion using a signal obtained from a photoelectric conversion portion that is disposed in a direction different from the pupil division direction with respect to the defective photoelectric conversion portion, wherein the image pickup unit includes color filters corresponding for each of the microlenses, and wherein the defective photoelectric conversion portion compensating unit corrects a signal of the defective photoelectric conversion portion using a signal output from a photoelectric conversion portion having a same color as the defective photoelectric conversion portion.

15. A non-transitory storage medium that stores a program enabling a computer to execute the steps of:
performing a photoelectric conversion of each photoelectric conversion portion of an image pickup unit that includes two-dimensionally arrayed microlenses and a plurality of photoelectric conversion portions, two or more of the plurality of photoelectric conversion portions corresponding to one microlens;

generating a recording image using a signal output from the plurality of photoelectric conversion portions;

compensating a defective photoelectric conversion portion using the image signal of a peripheral photoelectric conversion portion for an output of a defective photoelectric conversion portion storage unit that stores defective photoelectric conversion portion information of the image pickup unit; and performing focus detection of a pupil division method based on the image signal after the defective photoelectric conversion portion compensation step, wherein the defective photoelectric conversion portion compensating step compensates the signal of the defective photoelectric conversion portion using a signal obtained from a photoelectric conversion portion that is disposed in a direction different from the pupil division direction with respect to the defective photoelectric conversion portion, wherein the image pickup unit includes color filters corresponding for each of the microlenses, and wherein the defective photoelectric conversion portion compensating unit corrects a signal of the defective photoelectric conversion portion using a signal output from a photoelectric conversion portion having a same color as the defective photoelectric conversion portion.

16. A non-transitory storage medium that stores a program enabling a computer to execute the steps of:

performing a photoelectric conversion of each photoelectric conversion portion of an image pickup unit that includes two-dimensionally arrayed microlenses and a plurality of photoelectric conversion portions, two or more of the plurality of photoelectric conversion portions corresponding to one microlens;

generating a recording image using a signal output from the plurality of photoelectric conversion portions;

compensating a defective photoelectric conversion portion using the image signal of a peripheral photoelectric conversion portion for an output of a defective photoelectric conversion portion storage unit that stores defective photoelectric conversion portion information of the image pickup element; and generating images having a plurality of parallaxes that correspond to different pupil positions of the image pickup lens based on the image signal that has been obtained by the photoelectric conversion by a photoelectric conversion portion corresponding to the pupil positions after the defective photoelectric conversion portion compensation step, wherein the defective photoelectric conversion portion compensating step compensates the signal of the defective photoelectric conversion portion using a signal obtained from a photoelectric conversion portion that is disposed in a direction different from the pupil division direction with respect to the defective photoelectric conversion portion, wherein the image pickup unit includes color filters corresponding for each of the microlenses, and wherein the defective photoelectric conversion portion compensating unit corrects a signal of the defective photoelectric conversion portion using a signal output from a photoelectric conversion portion having a same color as the defective photoelectric conversion portion.

* * * * *